Feb. 28, 1967   M. L. COPPLE   3,306,241
AMMONIATED FERTILIZER SEALING DEVICE
Filed Aug. 9, 1965

INVENTOR.
Maurice L. Copple
BY
Samj. Slotsky
ATTORNEY

United States Patent Office 3,306,241
Patented Feb. 28, 1967

3,306,241
AMMONIATED FERTILIZER SEALING DEVICE
Maurice L. Copple, Sloan, Iowa 51055
Filed Aug. 9, 1965, Ser. No. 478,170
3 Claims. (Cl. 111—7)

My invention relates to a fertilizer sealing device.

An object of my invention is to provide a device usable with liquefied ammonia of the type which expands into a gas, and which gas is forced by pressure into the soil to provide a fertilizing feature.

An important object of my invention is to provide certain features wherein the fertilizer gas is efficiently sealed in the soil so that the gas will not escape.

A further object of my invention is to provide further adjustments whereby the sealing effects can be regulated etc.

Figure 1:
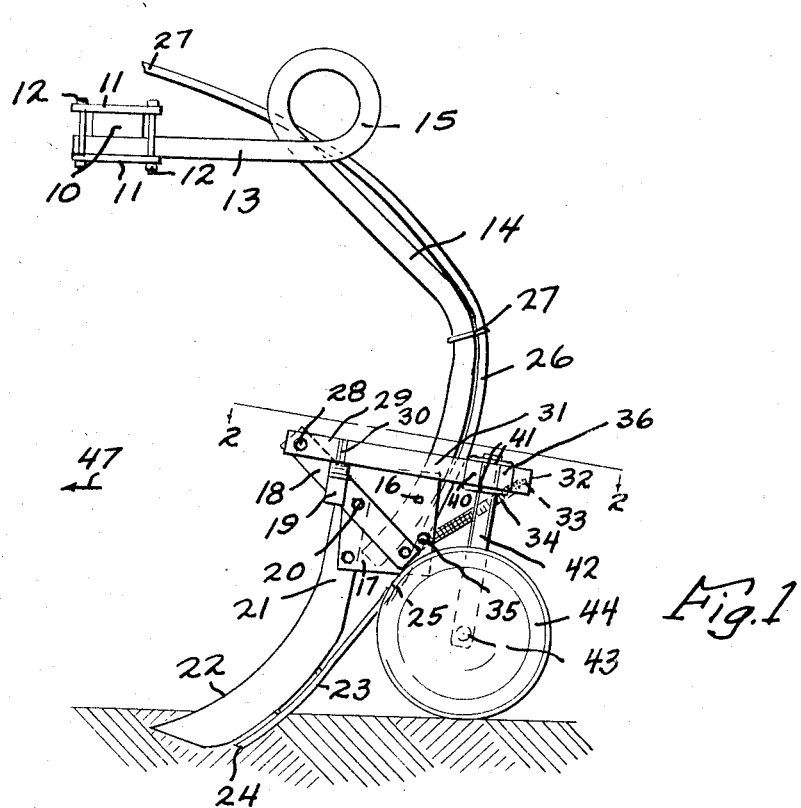
Figure 3:
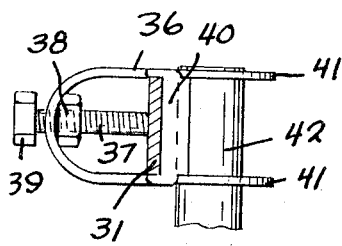
Figure 2:
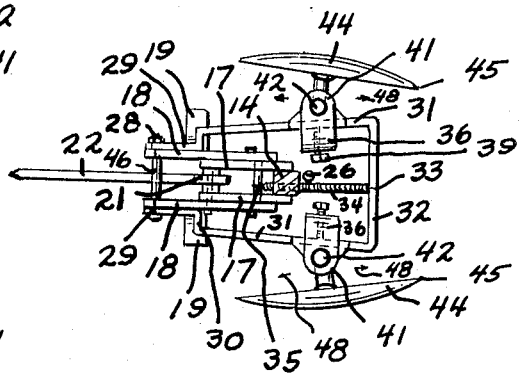
Figure 4:
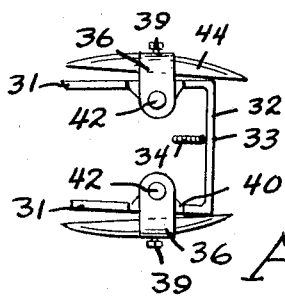

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a side elevation of my device as attached to a fertilizer arrangement, FIGURE 2 is a sectional view of FIGURE 1 taken substantially along the lines 2—2 thereof, FIGURE 3 is an enlarged detail of the clamp arrangement, and FIGURE 4 is a further view similar to FIGURE 2 showing the discs in a more closely spaced relation.

My invention contemplates the provision of a device which will work cooperatively with ammoniated fertilizer arrangements to efficiently seal the gases in the soil as soon as the gases are applied.

In describing my invention, I have used the character 10 to designate a standard tool bar attached to a tractor and clamped to the bar 10 by means of the plates 11 and bolts 12 is one end 13 of the fertilizer support member 14 having the coiled portion 15 to provide resiliency and secured to the lower end of the member 14 as at 16 are a pair of spaced vertically positioned plates 17, and attached to the plates 17 are the angularly positioned bars 18 having the stop members 19 welded thereto, the plates 17 also being secured by means of the removable bolts 20 to the upper portions 21 of the blade 22 which is adapted to penetrate into the soil, and secured to the blade 22 is a hollow tube 23 having the lower open end 24, which tube is connected as at 25 to the flexible further tube 26 passing at 27 to a suitable tank of liquid ammonia which ammonia when expanded through the tubes 26 and 23 will be in a gaseous form to penetrate into the soil at 24.

Pivoted at 28 to the bars 18 are the further arms 29 which are outwardly bent at 30 and which continue into the integral portions 31 which are attached to the cross strap 32.

Attached to the strap 32 at 33 is a coiled helical spring 34 which is attached tot he pin 35 which passes through the plates 17, this spring serving to provide a resilient connection to the bar 31.

The character 36 indicates a pair of clamps attached to the portions 31, the clamps being secured to the members 31 by means of the screws 37 threadably engaged with the bolts 38 which are welded to the clamp members 36, the heads of the bolts being indicated by the character 39. The character 40 indicates further clamp portions, and the character 41 indicates further clamp ear portions. The clamps are rigidly secured to the shanks 42 which extend downwardly, and to which are journalled at 43, the converging discs 44, these discs being slightly concave as shown.

It will be noted that the forward edges of the discs 44 are wider apart than the rear edges 45.

The character 46 indicates a spacer member positioned between the members 18 and through which the bolt at 28 passes, and the bolt 28 can be journalled in any desired manner within the members 18 and 29.

The manner of bolting the shanks 42 to the parts 31 is obvious from the drawings.

The device operates in the following manner. As the unit travels forwardly in the direction of the arrow 47, the blade 22 of course will pass through the soil and at the same time the fertilizing ammoniated gas will pass into the soil at 24. During this action or motion, the discs 44 will rotate and will completely pulverize the soil which will then be thrown directly over the gases which are emitted therefore completely sealing the gases so that they cannot escape. As a result, a considerable amount of these gases will be saved and will be rendered useful for the purposes intended. The spring 34 maintains the discs in their lower position at all times regardless of the roughness of the soil surface etc., the stop members 19 limiting downward movement of the members 31.

By loosening the screws 39 the brackets can be moved in either direction of the arrows 48 so that the positioning of the discs forwardly or rearwardly can be adjusted for different soil conditions or for different covering characteristics.

If it is desired to bring the discs closer together, the arrangement can be adjusted as shown in FIGURE 4, in which the bracket elements 36 are reversed and with the set screws 39 being positioned outwardly of the frame, and with the shanks 42 and the discs 44 being positioned as shown, this arrangement therefore bringing the discs much closer together if desired for closer packing of the soil and the like.

Any number of units can be used in gangs, and it will now be noted that I have provided the advantages set forth in the objects of my invention with further advantages being apparent.

Some changes may be made in the construction and arrangements of the parts of my invention without departing from the real spirit and purpose of my invention, and it is my intention to cover by my claims any modified forms of structure or use of mechanical equivalents which may be reasonably included within their scope.

I claim as my invention:

1. An ammoniated fertilizer sealing device comprising a blade, a tube attached to said blade and adapted to eject a fertilizing gas adjacent said blade, a pair of transversely spaced discs positioned rearwardly of said blade and adapted to pulverize soil behind said blade and to seal said gas into said soil, said discs converging rearwardly, substantially vertical shanks to which said discs are journalled, a horizontally extending framework to which said shanks are attached, vertically positioned spaced plates attached to said blade, angularly positioned straps attached to said plates, said framework being pivotally connected to said straps, stop members attached to said straps and adapted to limit downward movement of said framework, and resilient means connecting said plates and said framework.

2. A device as set forth in claim 1, wherein said shanks are attached to said framework by brackets which include means for positioning said brackets at selected positions along said framework.

3. A device as set forth in claim 2, wherein said brackets are reversible and adapted to position said shanks exteriorly of said framework, or interiorly thereof, to correspondingly vary the spacing between said discs.

References Cited by the Examiner
UNITED STATES PATENTS

| | | | |
|---|---|---|---|
| 2,734,439 | 2/1956 | Padrick | 111—7 X |
| 2,771,044 | 11/1956 | Putifer | 111—85 |
| 3,157,139 | 11/1964 | Spindler | 111—7 |
| 3,237,702 | 3/1966 | Orendorff | 111—85 X |

ABRAHAM G. STONE, *Primary Examiner.*

R. E. BAGWILL, *Assistant Examiner.*